(12) United States Patent
Becoulet et al.

(10) Patent No.: US 12,404,807 B2
(45) Date of Patent: Sep. 2, 2025

(54) AIRCRAFT TURBOMACHINE COMPRISING A DEVICE FOR LUBRICATING A BEARING

(71) Applicant: Safran Aircraft Engines, Paris (FR)

(72) Inventors: Julien Fabien Patrick Becoulet, Moissy-Cramayel (FR); Serge René Morreale, Moissy-Cramayel (FR); Olivier Renon, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 55 days.

(21) Appl. No.: 17/923,984

(22) PCT Filed: May 9, 2021

(86) PCT No.: PCT/FR2021/050790
§ 371 (c)(1),
(2) Date: Nov. 8, 2022

(87) PCT Pub. No.: WO2021/229167
PCT Pub. Date: Nov. 18, 2021

(65) Prior Publication Data
US 2023/0184167 A1 Jun. 15, 2023

(30) Foreign Application Priority Data
May 13, 2020 (FR) .................................. 2004717

(51) Int. Cl.
*F02C 7/06* (2006.01)
*F01D 25/18* (2006.01)
*F02C 7/36* (2006.01)

(52) U.S. Cl.
CPC ............... *F02C 7/06* (2013.01); *F01D 25/18* (2013.01); *F01D 25/183* (2013.01); *F02C 7/36* (2013.01);
(Continued)

(58) Field of Classification Search
CPC ............... F02C 7/06; F02C 7/36; F01D 25/18
See application file for complete search history.

(56) References Cited

U.S. PATENT DOCUMENTS 5,272,868 A * 12/1993 Ciokajlo ................. F02K 3/072
60/39.08
7,591,754 B2 * 9/2009 Duong ....................... F02C 7/36
475/346
(Continued)

FOREIGN PATENT DOCUMENTS

| EP | 3460199 A1 | 3/2019 |
|---|---|---|
| EP | 3575562 A1 | 12/2019 |
| FR | 2977636 A1 | 1/2013 |

OTHER PUBLICATIONS

International Patent Application No. PCT/FR2021/050790, International Search Report (and translation) and Written Opinion, dated Sep. 13, 2021.

*Primary Examiner* — Michael A Riegelman
(74) *Attorney, Agent, or Firm* — Kilpatrick Townsend & Stockton LLP

(57) ABSTRACT

The invention relates to a turbomachine for an aircraft, comprising:
a first rotor comprising a first shaft,
a second rotor comprising a second shaft,
a mechanical reduction gearing having an epicyclic gear set comprising a sun gear connected to the second shaft, a ring gear connected to the first shaft, and planet gears located between the sun gear and the ring gear and borne by a planet carrier attached to a stator of the turbomachine,
rolling element bearings for guiding said first shaft and second shaft in rotation,
an annular gutter which extends around the ring gear of the reduction gearing and which is configured to (Continued)

recover oil for lubricating the reduction gearing that is sprayed by centrifugal action out from the ring gear during operation, and an annular bearing support which is attached, with the gutter, to a stator of the turbomachine and which supports at least one of said bearings, characterized in that it also comprises:

at least one device for conveying oil recovered by said gutter, which device is borne by said annular support and extends as far as said at least one bearing in order to lubricate the latter.

8 Claims, 3 Drawing Sheets

(52) U.S. Cl.
CPC .... *F05D 2220/323* (2013.01); *F05D 2240/50* (2013.01); *F05D 2240/55* (2013.01); *F05D 2260/98* (2013.01)

(56) References Cited

U.S. PATENT DOCUMENTS

| | | | | |
|---|---|---|---|---|
| 7,704,178 | B2* | 4/2010 | Sheridan | F16H 57/0421 |
| | | | | 475/159 |
| 8,246,503 | B2* | 8/2012 | Sheridan | F02C 7/36 |
| | | | | 184/6.12 |
| 9,057,326 | B2* | 6/2015 | Charier | F01D 1/24 |
| 10,287,915 | B2* | 5/2019 | McCune | F01D 25/18 |
| 11,125,318 | B2* | 9/2021 | Chevillot | F16H 57/0456 |
| 11,255,221 | B2* | 2/2022 | Zatorski | F01D 25/16 |
| 11,598,268 | B2* | 3/2023 | Belmon | F02C 7/36 |
| 2008/0116010 | A1* | 5/2008 | Portlock | F01D 25/18 |
| | | | | 184/6.12 |
| 2011/0311361 | A1* | 12/2011 | Charier | F04D 19/026 |
| | | | | 416/129 |
| 2012/0324899 | A1* | 12/2012 | DiBenedetto | F01D 25/18 |
| | | | | 60/39.08 |
| 2013/0102432 | A1* | 4/2013 | Imai | F16H 57/045 |
| | | | | 475/159 |
| 2014/0000721 | A1* | 1/2014 | McCune | F01D 25/20 |
| | | | | 137/1 |
| 2014/0294558 | A1* | 10/2014 | Haugh | F02C 7/14 |
| | | | | 415/115 |
| 2015/0300255 | A1* | 10/2015 | Gallet | F16H 57/0427 |
| | | | | 475/159 |
| 2015/0361829 | A1* | 12/2015 | McCune | F01D 25/18 |
| | | | | 415/122.1 |
| 2017/0254407 | A1* | 9/2017 | Cipolla | F16H 57/0486 |
| 2018/0023483 | A1* | 1/2018 | Le Pache | F02C 7/36 |
| | | | | 475/331 |
| 2019/0085725 | A1* | 3/2019 | Zatorski | F02C 3/067 |
| 2019/0360578 | A1* | 11/2019 | Chevillot | F16H 57/0456 |
| 2020/0032710 | A1* | 1/2020 | Jacquemard | F02C 7/06 |
| 2021/0156307 | A1* | 5/2021 | Simon | F01D 25/18 |
| 2022/0235711 | A1* | 7/2022 | Becoulet | F16H 57/082 |
| 2022/0372912 | A1* | 11/2022 | Kubiak | F16H 57/0456 |
| 2023/0184167 | A1* | 6/2023 | Becoulet | F01D 25/162 |
| | | | | 184/6.11 |
| 2023/0417185 | A1* | 12/2023 | Ertas | F16H 57/0479 |
| 2024/0011443 | A1* | 1/2024 | Pennacino | F16H 57/0479 |

* cited by examiner

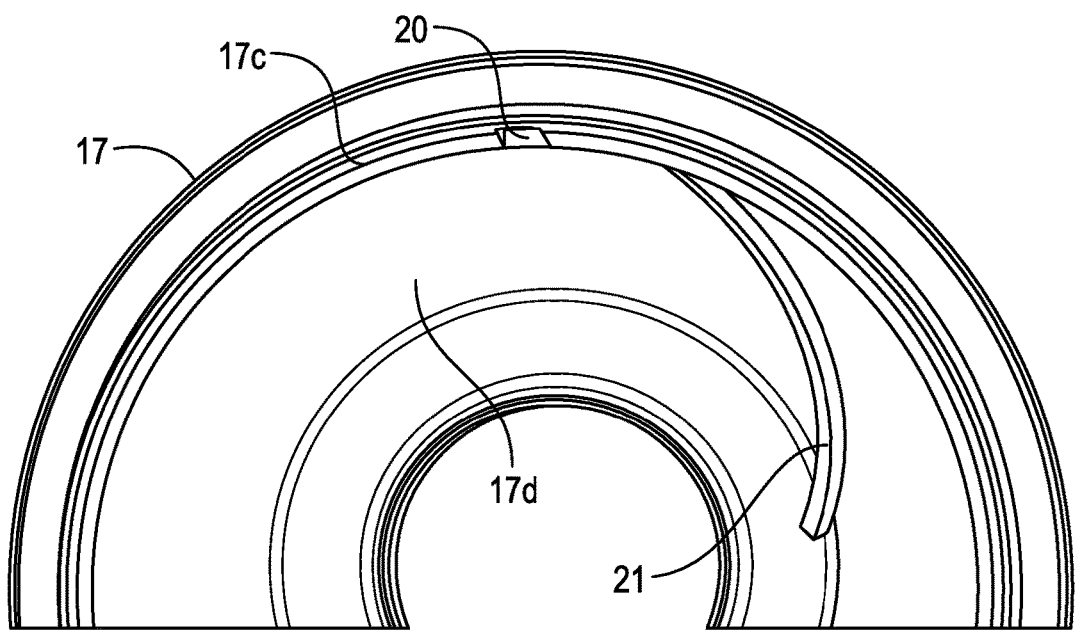
FIG. 5
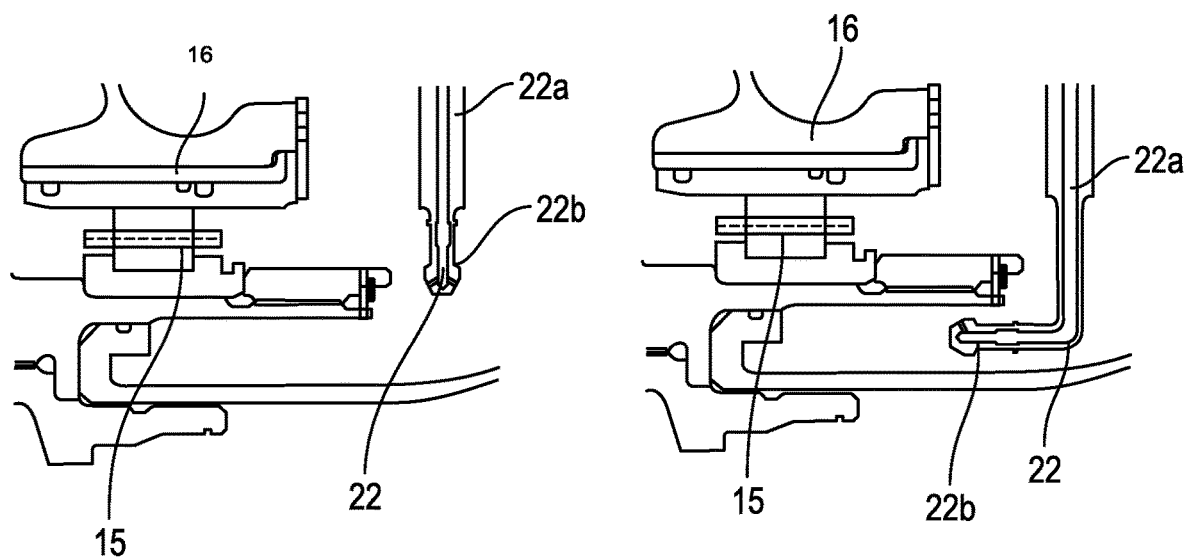
FIG. 6A FIG. 6B

AIRCRAFT TURBOMACHINE COMPRISING A DEVICE FOR LUBRICATING A BEARING

CROSS REFERENCE TO RELATED APPLICATIONS

This application is a national phase application of International Patent Application PCT/FR2021/050790 ("the '790 application"), filed on May 9, 2021 and titled "AIRCRAFT TURBOMACHINE COMPRISING A DEVICE FOR LUBRICATING A BEARING," which application is related to and claims priority benefits of France Patent Application No. 2004717 ("the '717 application"), filed on May 13, 2020. The '790 and '717 applications are hereby incorporated in their entireties by this reference.

TECHNICAL FIELD OF THE INVENTION

The invention relates to the technical field of aircraft turbomachine.

More particularly, the invention falls within the field of aircraft turbomachine comprising a counter-rotating turbine.

TECHNICAL BACKGROUND

The prior art is illustrated by the documents EP-A1-3 575 562, US-A1-2015/361829, FR-A1-2 977 636 and EP-A1-3 460 199.

Conventionally, an aircraft turbomachine comprises from upstream to downstream, in the direction of gas flow, a fan, a low-pressure compressor, a high-pressure compressor, an annular combustion chamber, a high-pressure turbine and a low-pressure turbine. The rotor of the low-pressure compressor is driven by the rotor of the low-pressure turbine, and the rotor of the high-pressure compressor is driven by the rotor of the high-pressure turbine.

From an engine performance and fuel consumption point of view, it is advantageous to maximise the rotational speed of the low-pressure turbine as it allows to obtain a better efficiency of the turbine. However, increasing the rotational speed of the turbine means increasing the centrifugal forces on it, and therefore greatly complicates its design.

One suggestion for increasing the efficiency of a turbine without increasing its rotational speed is to use a counter-rotating turbine. The low-pressure turbine is replaced by a two-rotor turbine with a first rotor configured to rotate in a first direction of rotation and connected to a first turbine shaft, and a second rotor configured to rotate in an opposite direction of rotation and connected to a second turbine shaft. The first and second turbine shafts are centred and guided in rotation by a plurality of guide bearings. The first rotor has turbine wheels interposed between turbine wheels of the second rotor.

A low-pressure turbine may have a rotational speed at take-off of the order of 4,000 rpm in a conventional architecture where the turbine drives the fan directly or a rotational speed at take-off of the order of 10,000 rpm in an architecture where the turbine drives the fan through a reduction gear. Its replacement by a counter-rotating turbine, the rotors of which rotate respectively at take-off speeds of the order of 3,000 and 7,000 revolutions per minute makes it possible to have a relative speed of 10,000 revolutions per minute (3,000+7,000) while having an absolute speed in a low range of the above-mentioned speed interval.

This counter-rotating turbine thus comprises a slow rotor and a fast rotor, the slow rotor driving the fan and the fast rotor meshing with a planetary-type epicyclic reduction gear, the input and output of which are counter-rotating (rotating ring gear, fixed planet carrier, rotating sun gear).

The reduction gear couples the fast rotor to the slow rotor, allowing power to be transferred from the fast rotor to the slow rotor. This takes advantage of the higher efficiencies of a fast turbine while transferring a large part of the power from the turbine to the fan without passing through a reduction gear but through a shaft.

This architecture is complex because of its mechanical integration: the mechanical reduction gear is for example located downstream of the turbomachine, radially inside a stator annular casing called the exhaust casing or upstream of the turbomachine, radially inside a stator annular casing called the intermediate casing.

Furthermore, as the reduction gear releases considerable energy (of the order of 100 kW) during operation, it must be lubricated continuously in order to maintain an acceptable operating temperature. An oil circuit is therefore implemented to supply the reduction gear with oil. The discharge of the oil is an essential problem. Indeed, the amount of oil required to operate the reduction gear is significant and its discharge is therefore complex as it requires cumbersome discharging devices that are difficult to implement in such an environment.

In addition, the guide bearings in rotation of the first and second turbine shafts must also be lubricated with a lubricating oil. The conveyance of lubricating oil to the guide bearings is also a major problem. The amount of oil to be conveyed to the guide bearings is significant in this type of configuration. The conveying devices are therefore complex to implement in this type of environment, as are the oil discharging devices.

There is therefore a need to provide a turbomachine in which the oil for lubricating the reduction gear can be easily recovered and discharged and in which the bearings can be easily lubricated.

SUMMARY OF THE INVENTION

To this end, the invention provides a turbomachine for an aircraft, comprising:
 a first rotor comprising a first shaft,
 a second rotor comprising a second shaft,
 a mechanical epicyclic reduction gear comprising a sun gear connected to the second shaft, a ring gear connected to the first shaft, and planet gears located between the sun gear and the ring gear and carried by a planet carrier fixed to a stator of the turbomachine,
 rolling bearings for guiding in rotation of said first and second shafts,
 an annular gutter which extends around the ring gear of the reduction gear and which is configured to recover the oil for lubricating the reduction gear which is sprayed by centrifugal action out of the ring gear during operation, and
 an annular bearing support which is fixed with the gutter to a stator of the turbomachine and which supports at least one of said bearings.

The turbomachine is distinguished in that it further comprises at least one device for conveying oil recovered by said gutter, which is carried by said annular support and which extends to said at least one bearing for the purpose of lubricating it.

The turbomachine thus comprises a gutter for recovering oil for lubricating the reduction gear. According to the invention, the turbomachine also comprises a device for conveying at least a part of the oil recovered by the gutter which extends to the bearing. The conveying device thus allows the oil for lubricating the reduction gear recovered by the gutter to be used to lubricate the bearing. Thanks to the invention, it is therefore possible to dispense with a specific oil supply to lubricate the bearing, offering a considerable cost saving.

In addition, as a part of the oil for lubricating the reduction gear is used to lubricate the bearing, the total quantity of oil to be injected and discharged is reduced. The oil to be injected and discharged is conveyed through an oil circuit passing through arms of a casing of the turbomachine. It is therefore possible to reduce the size of the circuit, facilitating its integration into the arms of the casing of the turbomachine.

The turbomachine according to the invention may comprise one or more of the following features, taken in isolation from each other or in combination with each other:
- the conveying device comprises a scoop configured to take up the oil recovered by the gutter, the scoop being provided in an annular side wall of the gutter;
- the conveying device comprises at least one pipe for conveying oil taken up from the scoop to said at least one bearing, the pipe extending between a first end connected to the gutter and a second end extending to the bearing;
- the conveying pipe has a generally helical shape about a longitudinal axis of the turbomachine;
- the conveying pipe is formed in a rib projecting from an inner annular surface of said annular support, or by a tube carried by the annular support;
- the conveying device comprises at least one jet for spraying oil to said at least one bearing, the jet being carried by said annular support;
- said at least one jet has a generally rectilinear or angled shape;
- the first shaft is fixed to the ring gear and extends at least in part between the reduction gear and said annular support, this first shaft being guided by said at least one bearing supported by this annular support and lubricated by said device;
- said at least one jet is axially interposed between said at least one bearing and a dynamic annular seal mounted around the first shaft;
- an annular casing which extends at least in part around the reduction gear and to which said annular support and said gutter are fixed, this annular casing comprising arms extending radially with respect to a longitudinal axis of the turbomachine and passing through a flow vein of a gas flux inside the turbomachine.

BRIEF DESCRIPTION OF THE FIGURES

Further features and advantages will be apparent from the following description of a non-limiting embodiment of the invention with reference to the attached drawings in which:

FIG. 5 is a further perspective view of an element of the invention shown in FIG. 3;

FIG. 6a is a schematic representation of a first example of an embodiment of a jet that may be fitted to the invention;

FIG. 6b is a schematic representation of a second example of an embodiment of a jet that can be fitted to the invention;

DETAILED DESCRIPTION OF THE INVENTION

Figure 1:
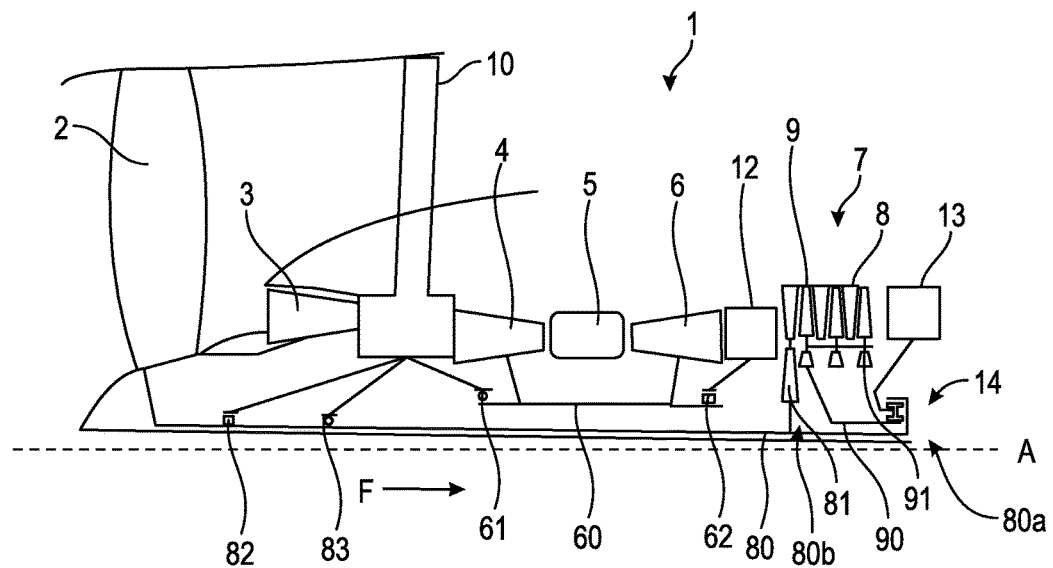
FIG. 1 is a very schematic representation of an aircraft turbomachine half according to the invention.

An aircraft turbomachine 1 is for example shown in FIG. 1. The turbomachine 1 is, for example, a counter-rotating turbine for turbomachine 1. The turbomachine 1 extends along a longitudinal axis A.

The turbomachine 1 comprises, from upstream to downstream in the direction of gas flow F, a fan 2, a low-pressure compressor 3, a high-pressure compressor 4, an annular combustion chamber 5, a high-pressure turbine 6 and a counter-rotating turbine 7.

The turbomachine 1 further comprises a plurality of structural casings. For example, it comprises an intermediate casing 10 arranged between the low-pressure compressor 3 and the high-pressure compressor 4. The turbomachine 1 further comprises a turbine casing 12. The turbine casing 12 is for example equipped with arms forming rectifier vanes and is called TVF (Turbine Vane Frame). The turbine casing 12 is arranged between the high-pressure turbine 6 and the counter-rotating turbine 7. The turbomachine 1 also includes an exhaust casing 13. The exhaust casing 13 is for example the last turbine casing and is called TRF (Turbine Rear Frame).

The high-pressure turbine 6 comprises a rotor which drives in rotation a rotor of the high-pressure compressor 4 via a high-pressure shaft 60. The high-pressure shaft 60 is centred and guided in rotation by high-pressure bearings, such as an upstream high-pressure bearing 61 and a downstream high-pressure bearing 62. The upstream high-pressure bearing 61 is for example a ball bearing and the downstream high-pressure bearing 62 is for example a roller bearing. The upstream high pressure bearing 61 is mounted between an upstream end of the high-pressure shaft 60 and the intermediate casing 10.

The counter-rotating turbine 7 comprises a first rotor 8 comprising a first shaft 80 and a second rotor 9 comprising a second shaft 90.

More particularly, the first rotor 8 comprises a first series of wheels 81 configured to rotate in a first direction of rotation and connected to the first shaft 80. The second rotor 9 comprises a second series of wheels 91 configured to rotate in a direction opposite to the first direction of rotation and connected to the second shaft 90. The wheels 91 of the second series are interposed between the wheels 81 of the first series.

Each wheel 81, 91 comprises an annular row of blades each comprising an aerodynamic profile having a pressure side and suction side which meet to form a leading edge and a trailing edge of the gases in a vein of the counter-rotating turbine 7.

The first shaft 80 drives in rotation the fan 2 and the rotor of the low-pressure compressor 3.

In addition, the turbomachine 1 comprises rolling bearings for rotationally guiding the first shaft 80 and second shaft 90.

According to an example not shown, the second shaft 90 is centred and guided in rotation by means of two upstream and downstream guiding rolling bearings.

Figure 2:
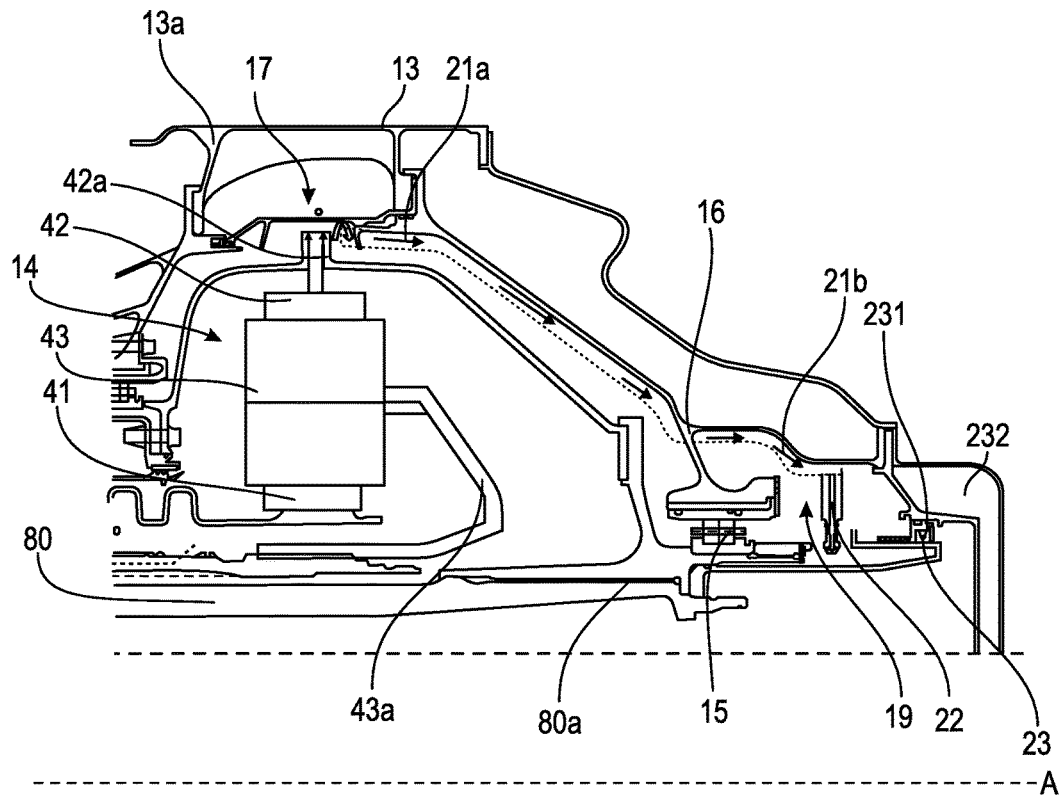
FIG. 2 is an enlarged schematic representation of a part of the turbomachine of FIG. 1.

The first shaft 80 is centred and rotationally guided downstream by at least one guide bearing, for example by at least one downstream guide bearing 15 visible in FIG. 2.

The first shaft 80 is centred and rotationally guided upstream by two upstream guide bearings 82, 83 mounted between the upstream end of the first shaft 80 and the intermediate casing 10.

In addition, the turbomachine 1 includes a mechanical epicyclic reduction gear 14. As best seen in FIG. 2, the reduction gear 14 comprises a sun gear 41 connected to the second shaft 90, a ring gear 42 connected to the first shaft 80 and planet gears 43 located between the sun gear 41 and the ring gear 42 and carried by a planet carrier 43a fixed to a stator of the turbomachine 1.

More particularly, the first shaft 80 has a downstream end 80a attached to an upstream end of a ring gear carrier 42a of the ring gear 42 and an upstream end 80b attached to the last stage of the first rotor 81 of the first turbine 8 as shown in FIG. 1.

The turbine casing 12 and the exhaust casing 13 comprise a central hub, and an outer ring which surrounds the hub and is connected thereto by a series of arms 13a. The arms 13a are substantially radial or inclined to the longitudinal axis A of the turbomachine 1 and pass through the vein of the turbine. The central hub of the exhaust casing 13 extends around at least part of the reduction gear 14.

The downstream bearing 15 is located downstream of the reduction gear 14. The downstream bearing 15 is supported by an annular bearing support 16 attached to a stator of the turbomachine 1, for example to the exhaust casing 13. The first shaft 80 extends at least partially between the reduction gear 14 and the support 16.

Furthermore, an annular dynamic seal 23 is mounted around the first shaft 80. The dynamic seal 23 is for example a segmented radial seal (JRS). The dynamic seal 23 is for example made of carbon. The dynamic seal 23 is, for example, housed in a groove 231 provided in a flange 232 of a fixed structure connected to the stator of the turbomachine 1, for example to the exhaust casing 13 and the support 16.

In operation, the reduction gear 14 is lubricated and the oil that has lubricated the reduction gear must be recovered and discharged for recycling to prevent this oil from accumulating in the reduction gear 14 and becoming coke under the effect of the high temperatures.

To this end, the turbomachine 1 comprises an annular gutter 17 which extends around the ring gear 42 of the reduction gear 14 and which is configured to recover the oil for lubricating the reduction gear 14 which is sprayed centrifugally out of the ring gear 42 during operation as illustrated by the rounded arrow in FIG. 2.

Figure 3:
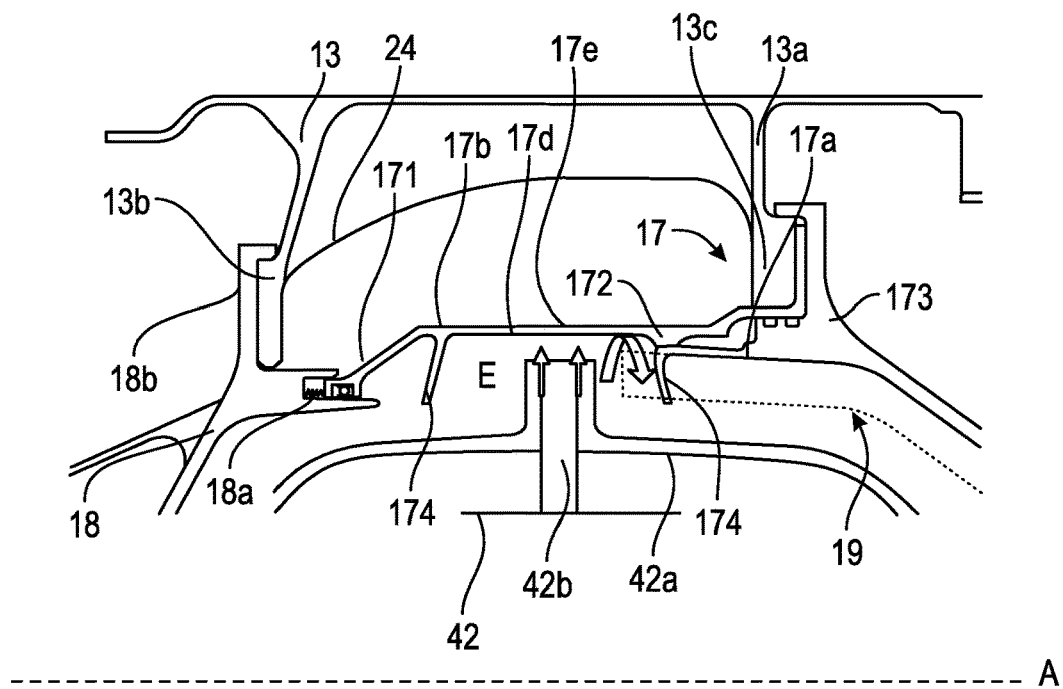
FIG. 3 is an enlarged view of a part of FIG. 2.

Specifically, the oil is centrifuged and ends up in the ring gear 42 of the reduction gear 14. As best seen in FIG. 3, passages 42b may be provided at the outer periphery of the ring gear 42 so as to centrifugally spray the oil onto the gutter 17 extending opposite these passages 42b. The passages 42b are, for example, oriented radially with respect to the longitudinal axis A of the turbomachine 1.

The gutter 17 is fixed with the annular bearing support 16 to the stator of the turbomachine 1, for example to the exhaust casing 13.

Figure 4:
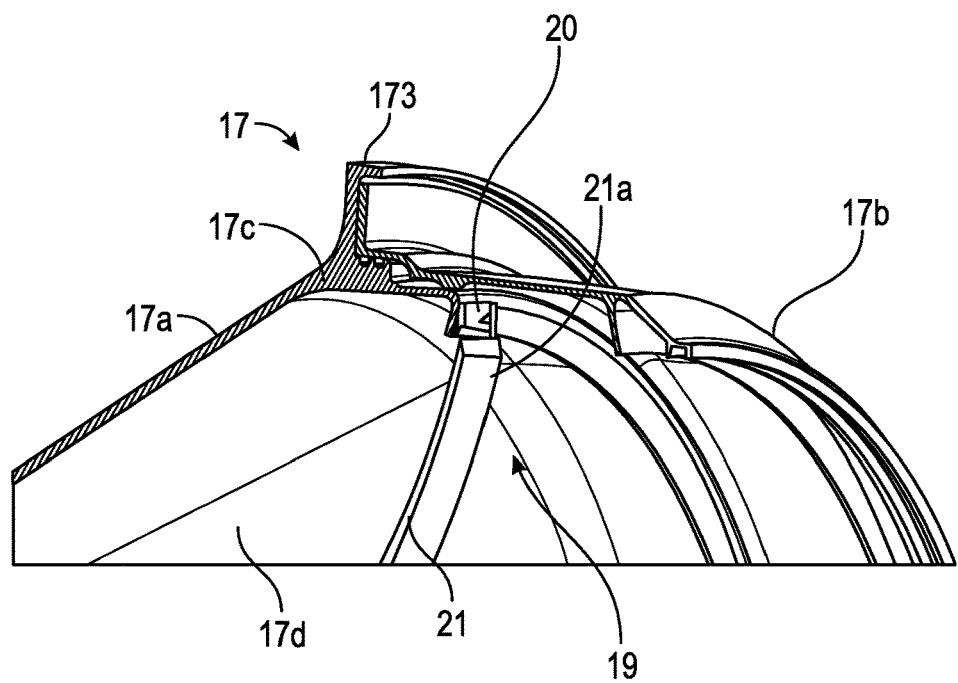
FIG. 4 is a perspective view of an element of the invention shown in FIG. 3.

As best seen in FIGS. 4 and 5, the gutter 17 has an annular side wall 17c. The gutter 17 further has an inner annular surface 17d and an outer annular surface 17e.

The gutter 17 is formed, for example, by the assembly of a first annular wall 17a and a second annular wall 17b mounted coaxially one inside the other. The first annular wall 17a is for example formed by the support 16.

Each of the walls 17a, 17b includes an annular discharge rib 174 radially projecting towards the inside.

The annular discharge ribs 174 axially delimit between them an oil recovery space E. The space E is radially delimited by the inner annular surface 17d.

In addition, the outer annular surface 17e is advantageously coated with an annular thermal insulation coating 24. The annular coating 24 is thus arranged radially between the exhaust casing 13 and the gutter 17. The annular lining 24 is separated from the exhaust casing 13 by an annular free space for air circulation and ventilation for example.

The second wall 17b comprises an upstream end 171 and a downstream end 172. The upstream end 171 of the second wall 17b is axially engaged in an annular groove 18a of a member 18 fixed to an upstream flange 13b of the exhaust casing 13 via a fixing flange 18b. The upstream flange 13b of the exhaust casing 13 is located substantially in line with the arms 13a of the exhaust casing 13. Preferably, an annular seal is arranged in the groove 13a and is in axial abutment with the upstream end 171 of the second wall 17b.

The downstream end 172 of the second wall 17b comprises a flange fixed to a downstream flange 13c of the exhaust casing 13, located substantially in line with the arms 13a.

The first wall 17a comprises a flange fixed to the downstream flange 13c of the exhaust casing 13.

The fixing flange forms a cylindrical rim 173 facing upstream to cooperate with the second wall 17b.

The gutter 17 includes openings (not shown) which ensure the passage of oil to discharge ducts (not shown). The ducts pass through the arms 13a of the exhaust casing 28. Advantageously, the gutter 17 comprises an oil recovery chamber (not shown) located at the lower part. The recovery chamber provides for the tranquillisation of the oil, i.e. part of its degassing or deaeration in order to reduce the number of air bubbles in the oil. Thus, the oil passes through the openings that communicate with the recovery chamber before being discharged through the ducts through the arms 13a of the exhaust casing 13 for example.

In order to reduce the total amount of oil to be conveyed and the amount of oil to be discharged through the arms 13a, and thus reduce the bulk of the ducts passing through the arms 13a, according to the invention, the turbomachine further comprises at least one device 19 for conveying oil recovered by the gutter 17 carried by the annular support 16 and which extends to at least one guide bearing, for example to the downstream guide bearing 15 for lubrication thereof.

As shown in FIG. 4, the device 19 comprises, for example, a scoop 20 for drawing off oil, at least one pipe 21 for conveying oil and at least one jet 22 (FIG. 2) for spraying oil to the guide bearing such as the downstream guide bearing 15 in rotation of the first shaft 80.

The scoop 20 is configured to take up oil collected by the gutter 17. The scoop 20 is provided in the annular side wall 17c of the gutter 17, for example of the first wall 17a.

The scoop 20 is in fluid communication with the pipe 21. The pipe 21 is used to convey the oil taken by the scoop 20 to the guide bearing, for example the downstream guide bearing 15.

As shown for example in FIG. 5, the pipe 21 has a helical shape around the longitudinal axis A of the turbomachine 1. The helical shape of the pipe 21 allows to limit the pressure losses of the oil taken by the scoop 20 during its conveyance to the guide bearing. The pipe 21 extends between a first end 21a connected to the gutter 17 and a second end 21b extending to the downstream bearing 15. The second end 21b is connected to the jet 22. More particularly, the first end 21a is connected to the first wall 17a of the gutter 17 and the second end 21b is connected to the jet 22, the pipe 21 extending along the support 16 between the first end 21a and the second end 21b.

In the example shown in FIG. 5, the pipe 21 is formed in a projecting rib on the inner annular surface 17d of the support 16. For example, the pipe 21 is formed in the rib 174 of the first wall 17a of the gutter 17 and extends into the support 16.

According to another example not shown, the pipe 21 is formed by a tube carried by the support 16.

The jet 22 is used to distribute the oil conveyed by the pipe 21 to the bearing 15. The jet 22 is for example carried by the support 16. The jet 22 is fixed to a downstream end of the support 16. The jet 22 is interposed axially between the bearing 15 and the dynamic seal 23. In order to limit the oil spraying on the dynamic seal 23, a spinner may be placed against the dynamic seal 23.

More particularly, the jet 22 comprises a cylindrical body 22a and an ejection nozzle 22b.

According to a first example embodiment shown in FIG. 6a, the jet 22 has a generally rectilinear shape. Thus, the cylindrical body 22a and the ejection nozzle 22b extend along the same axis perpendicular to the axis of the turbomachine 1. According to another embodiment shown in FIG. 6b, the jet 22 has a generally angled shape. The ejection nozzle 22b thus extends radially with respect to the cylindrical body 22a such that the ejection nozzle 22b extends parallel to the longitudinal axis A of the turbomachine 1. In this example, the ejection nozzle 22b is oriented towards the bearing 15. This configuration makes it possible to maximise the quantity of oil distributed to the bearing 15 in particular in the event of a loss of pressure during the conveyance of the oil in the pipe 21 resulting in too low a pressure in the jet 22.

The invention thus implements the gutter 17, which allows to recover the oil for lubricating the reduction gear 14 in order to limit the risks of coke formation in the reduction gear 14. Part of this oil is conveyed by the device 19 to the guide bearing, for example to the downstream guide bearing 15 in rotation of the first shaft 80 to lubricate it. In particular, the part of the oil conveyed is first taken from the gutter 17 by the scoop 20 which communicates with the pipe 21 allowing the oil to be conveyed to the jet 23 distributing the oil taken to the downstream guide bearing 15. As a result, the amount of oil remaining in the gutter 17 and discharged is less. The ducts of the gutter 17 extending into the arms 13a of the exhaust casing 13 can thus be sized to discharge a smaller amount of oil. This results in smaller ducts that can be integrated into the exhaust casing 13. Also, the costs associated with lubricating the reduction gear 14 and the bearing are reduced since the total amount of oil introduced is reduced by reusing some of the oil for lubricating the reduction gear 14.

Furthermore, the invention has been described in relation to a turbomachine 1 in which the reduction gear 14 is located downstream of the turbomachine 1 and is surrounded by the exhaust casing 13. The invention also applies to a turbomachine in which the reduction gear 14 is located upstream of the turbomachine 1 and is surrounded by the intermediate casing 10. According to this embodiment, the gutter 17 and the support 16 are attached to the intermediate casing 10. The same advantages result from this embodiment.

The invention claimed is:

1. A turbomachine for an aircraft, comprising:
   a first rotor comprising a first shaft,
   a second rotor comprising a second shaft,
   a mechanical epicyclic reduction gear comprising a sun gear connected to the second shaft, a ring gear connected to the first shaft, and planet gears located between the sun gear and the ring gear and carried by a planet carrier,
   rolling bearings for guiding in rotation said first and second shafts,
   an annular gutter which extends around the ring gear of the reduction gear and which is configured to recover for lubricating the reduction gear which is sprayed by centrifugal action out of the ring gear during operation, and
   an annular bearing support which is fixed with the gutter to a stator of the turbomachine or to another stator of the turbomachine and which supports at least one of said bearings,
   wherein the turbomachine further comprises:
   at least one device for conveying the oil recovered by said gutter, which is carried by said annular support and which extends to said at least one bearing with a view to lubricating the at least one bearing,
   the conveying device comprising:
   a scoop configured to take up the oil recovered by the gutter, the scoop being provided in an annular side wall of the gutter, and
   at least one pipe for conveying the oil taken up by the scoop to said at least one bearing, the pipe extending between a first end connected to the gutter and a second end extending to the bearing.

2. The turbomachine according to claim 1, wherein the conveying pipe has a generally helical shape about a longitudinal axis of the turbomachine.

3. The turbomachine according to claim 1, wherein the conveying pipe is formed:
   in a rib projecting from an inner annular surface of said annular support, or
   by a tube carried by the annular support.

4. The turbomachine according to claim 1, wherein the conveying device comprises at least one jet for spraying oil to said at least one bearing, the jet being carried by said annular support.

5. The turbomachine according to claim 4, wherein said at least one jet has a generally rectilinear or angled shape.

6. The turbomachine according to claim 5, wherein said at least one jet is interposed axially between said at least one bearing and a dynamic annular seal mounted around the first shaft.

7. The turbomachine according to claim 1, wherein the first shaft is fixed to the ring gear and extends at least in part between the reduction gear and said annular support, this first shaft being guided by said at least one bearing supported by this annular support and lubricated by said device.

8. The turbomachine according to claim 1, further comprising an annular casing which extends at least in part around the reduction gear and to which said annular support and said gutter are fixed, the annular casing comprising arms extending radially with respect to a longitudinal axis of the turbomachine and passing through a flow vein of a gas flux inside the turbomachine.

* * * * *